May 11, 1926.
W. OWEN
1,583,793
APPARATUS FOR MAKING SHEET GLASS
Filed Sept. 26, 1922     5 Sheets-Sheet 2
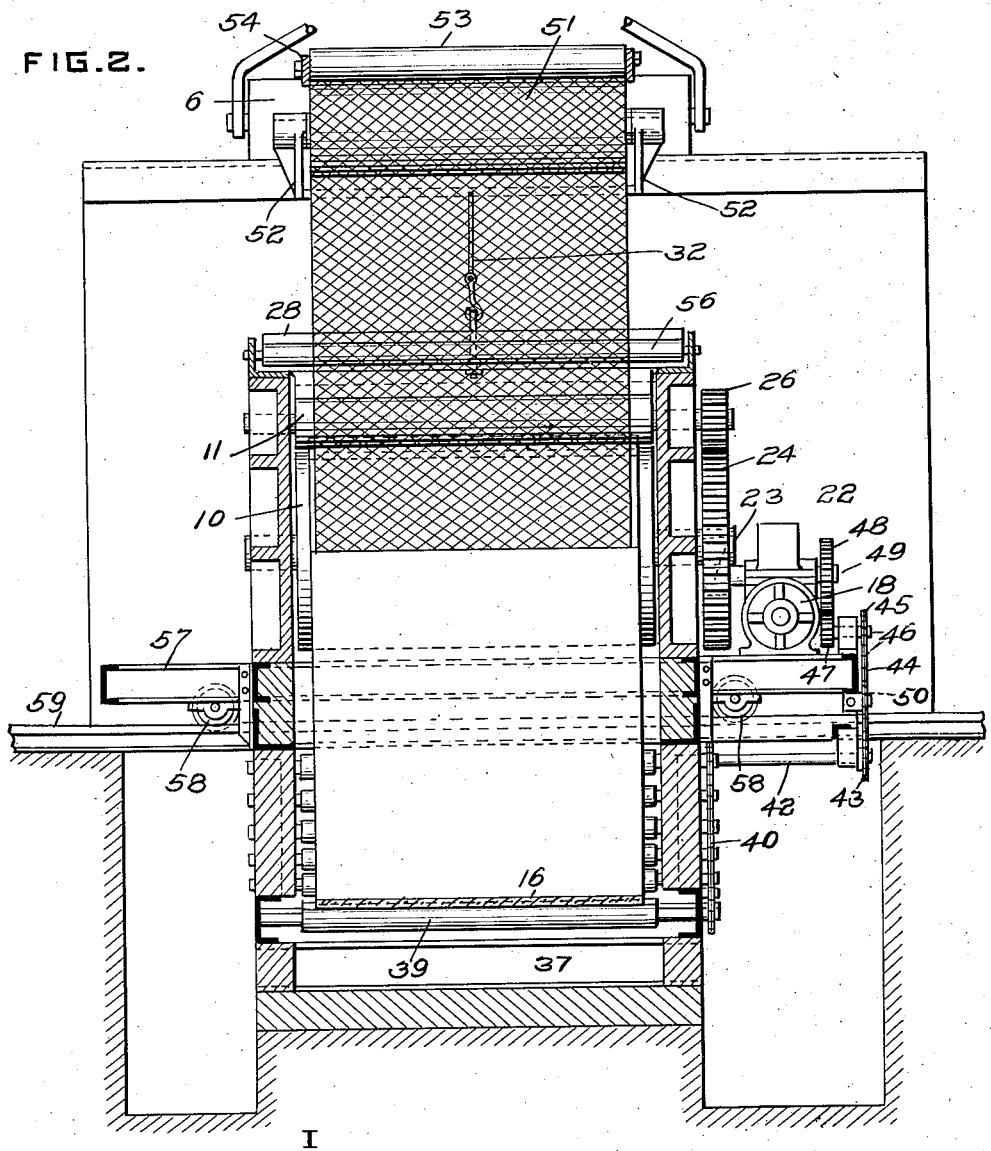
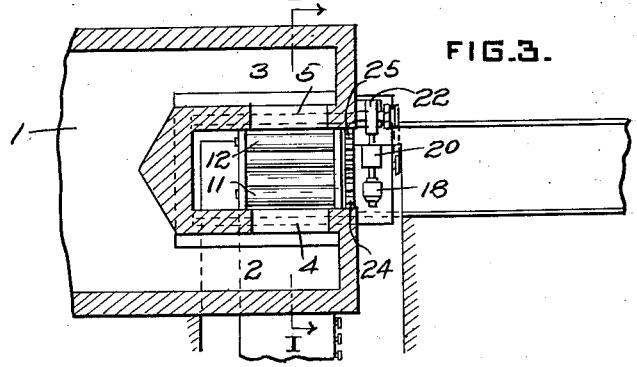
INVENTOR
William Owen
by
James C. Bradley
atty May 11, 1926. 1,583,793
W. OWEN
APPARATUS FOR MAKING SHEET GLASS
Filed Sept. 26, 1922 5 Sheets-Sheet 3

INVENTOR
William Owen
by
James C. Bradley
atty

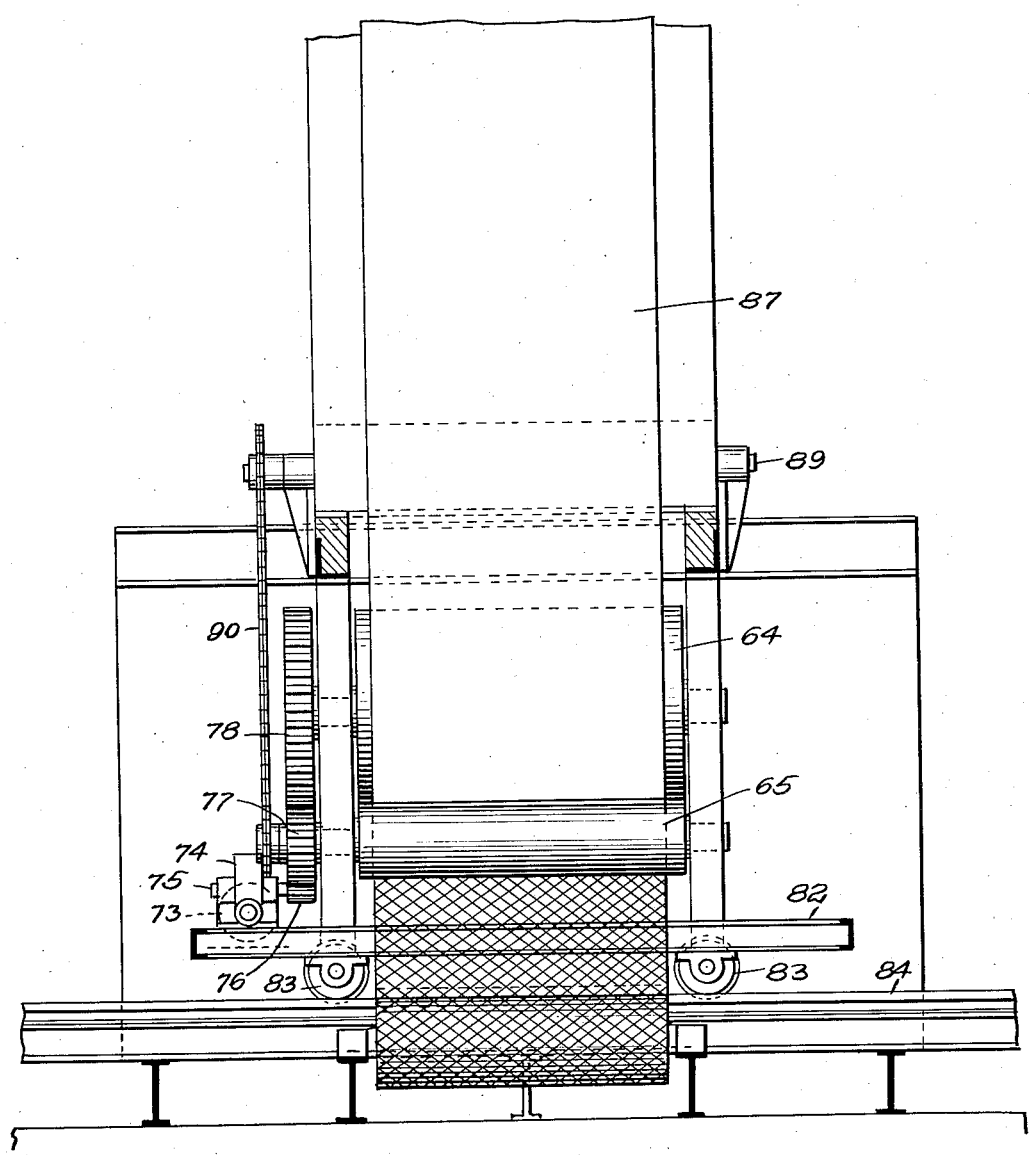

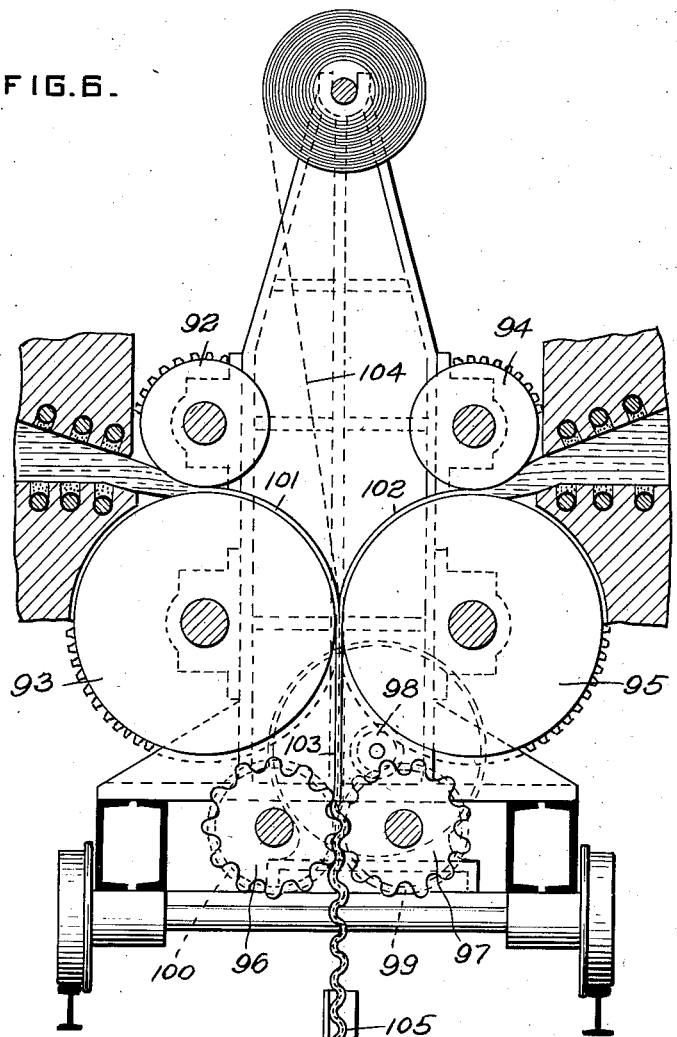
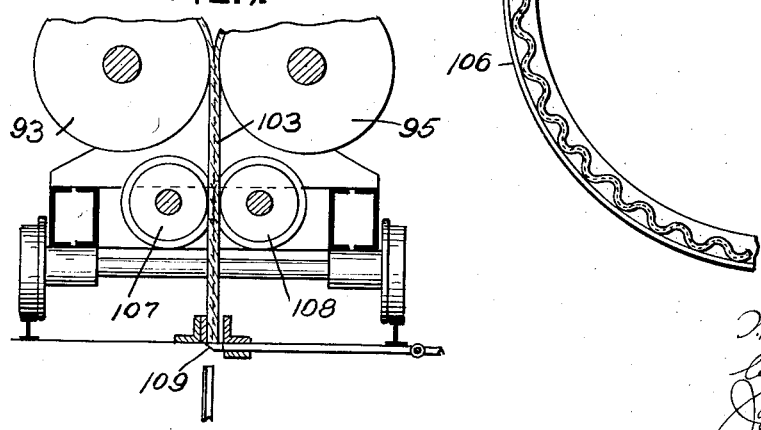

Patented May 11, 1926.

1,583,793

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR MAKING SHEET GLASS.

Application filed September 26, 1922. Serial No. 590,634.

Figure 1:
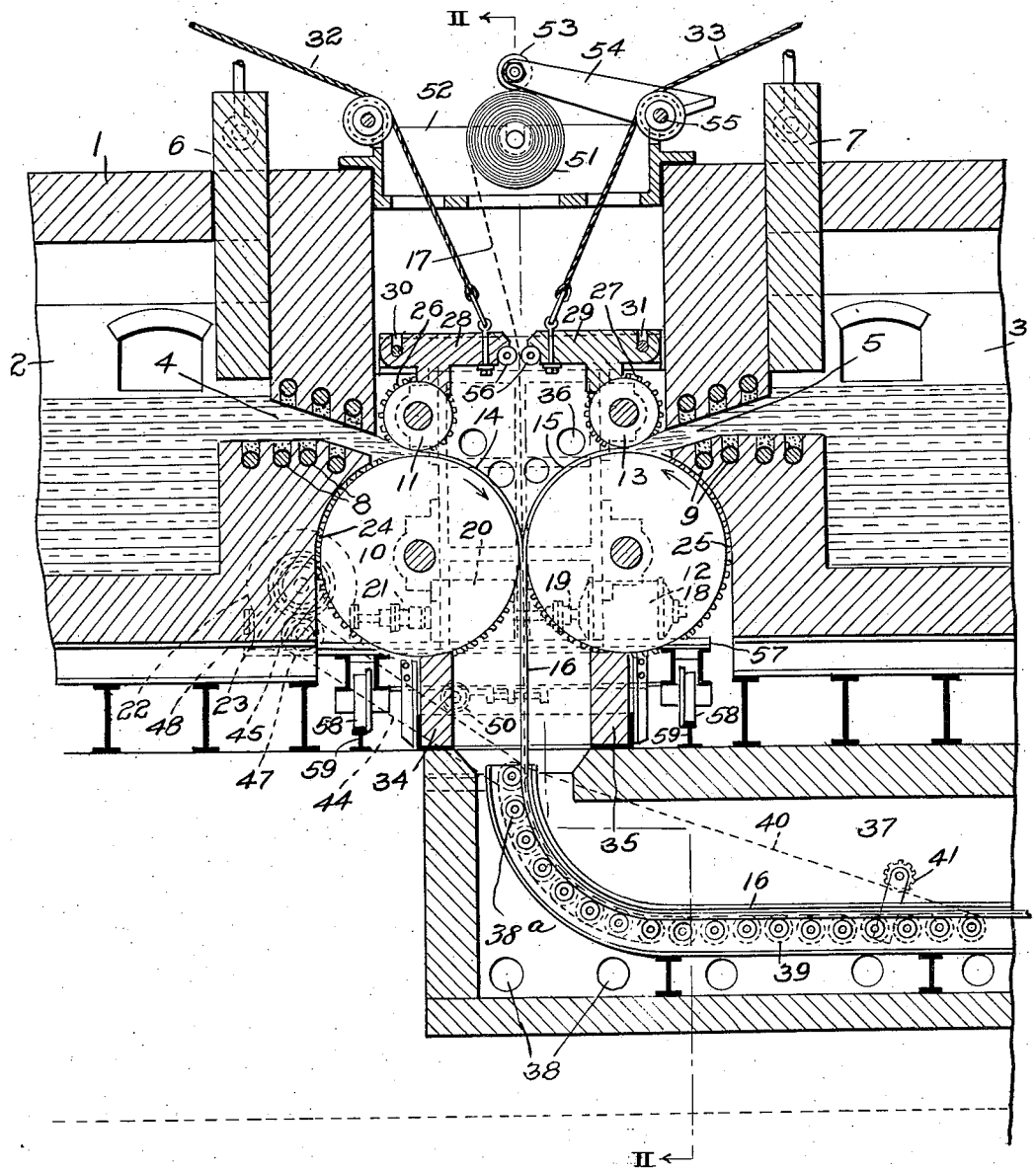
Figure 4:
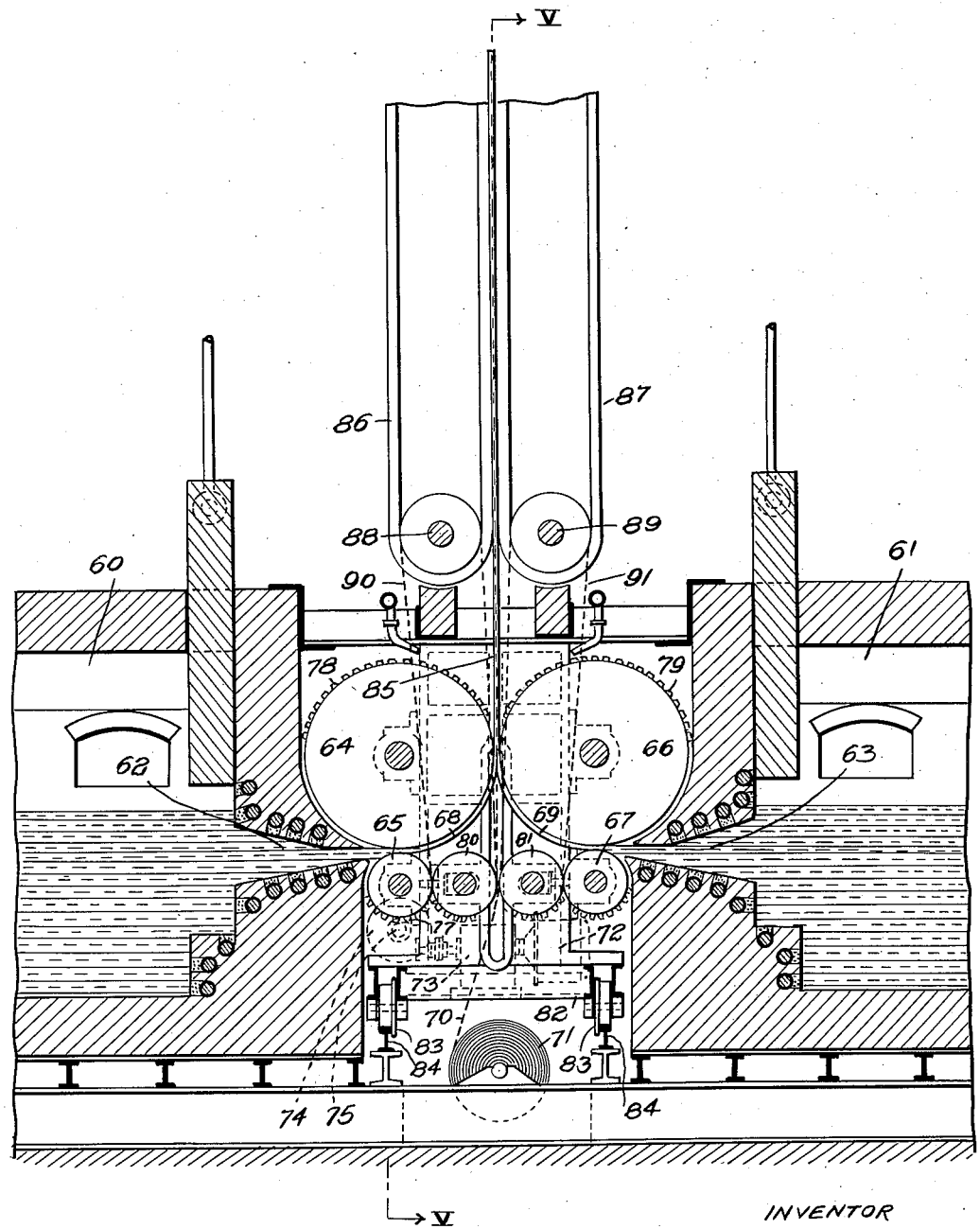

The invention relates to apparatus for making sheet glass and particularly wire or reinforced glass, although not limited to use in such connection. It has for its principal objects the provision of an improved arrangement for continuously forming and welding together two ribbons of glass, such operation giving an opportunity, to feed between the ribbons as they converge, the wire mesh or other reinforcing means which is to be incorporated into the finished sheet. In order to provide the most convenient arrangement for forming and bringing the ribbons together, and in order to give a maximum amount of clearance or working space above and below the sheet forming and welding rolls, the ribbons are drawn from opposing tank chambers and then turned vertically between a pair of rolls where the two sheets are welded together, the wire mesh or other reinforcing means being introduced at this point. The compound sheet thus formed is then bent laterally and carried through a horizontal leer. The two opposing drawing chambers from which the ribbons are formed may be parts of independent melting tanks, but preferably these chambers are formed at the end of a common melting tank, so that the glass level and temperature conditions are more readily maintained in correspondence than where two entirely independent tanks are employed. Certain embodiments of the invention are illustrated in the accompanying drawings wherein:

Figure 1 is a vertical section through the apparatus on the line I—I of Fig. 3; Fig. 2 is a vertical section on the line II—II of Fig. 1; Fig. 3 is a partial horizontal section through the apparatus on a reduced scale, such section being taken at the level of the outlet slots; Fig. 4 is a vertical section through a modification in which the finished sheet is fed upwardly instead of downwardly; Fig. 5 is a vertical section on the line V—V of Fig. 4; and Figs. 6 and 7 are vertical sections through modifications involving the corrugating of the glass.

Referring to Figs. 1 and 3, 1 is a glass melting tank preferably of the regenerator type which is made at its forward end of U shape in horizontal cross section (Fig. 3) in order to provide the two opposing drawing chambers 2 and 3, having the outlet slots or passages 4 and 5, preferably located below the level of the glass in the tank. Provision is made for shutting off the flow of glass through the passages in the form of the vertically movable shear cakes or gates 6 and 7 suitably counterbalanced and movable vertically by means which are not shown. In order to regulate the temperature of the glass flowing through the passages 4 and 5 and also to melt any glass which may solidify in these passages intermediate rolling operations, the resistance coils 8 and 9 are employed. These resistance coils are preferably of nichrome or other suitable material and are insulated and sealed in the grooves surrounding the passages 4 and 5 by means of refractory cement.

Opposite the outlet ends of the slots are the pairs of rolls 10 and 11 and 12 and 13, such rolls preferably being hollow and water cooled in order to chill the glass and prevent it sticking to the rolls. The glass ribbons 14 and 15 which are formed between the two sets of rolls are brought together in the vertical pass between the two lower rolls 10 and 12 where they are welded into the composite sheet 16, a suitable wire mesh 17 being fed into the space between the two sheets just before they are pressed together by the rolls 10 and 12.

The rolls are driven from the motor 18 mounted upon a suitable supporting framework and having an axle 19 leading to suitable reducing gearing in the casing 20. The driving axle 21 from this reducing gearing operates through a worm drive in the casing 22 to drive the pinion 23 (Fig. 1) which engages a spur gear 24 keyed to the axle of the roll 10. The axle of the roll 12 is provided with a spur gear 25 of the same diameter of the gear 24 and meshing with such gear so that the roll 12 is driven in the direction indicated by the arrows. The rolls 11 and 13 are driven from the rolls 10 and 12 by means of the spur gears 26 and 27 keyed to the axles of such rolls and meshing with the gears 24 and 25. Suitable adjustments (not shown) are provided for adjusting the bearings of the rolls, so that the rolls 10 and 11, 12 and 13 and 10 and 12 may be adjusted toward and from each other depending upon the thickness of glass which it is desired to produce.

The rolls are enclosed between the walls of the chambers 2 and 3 and by the swinging roof members 28 and 29 pivoted at 30 and 31 and movable up and down by the cables 32 and 33 provided with counterweights (not shown). These roof members in conjunction with the side walls of the chambers 2 and 3 and the walls 34 and 35 cut off the glass ribbons being formed from too free an access with the outside atmosphere, and if desired, additional heat may be supplied by the use of suitable burners projecting through the openings 36, this being in some cases necessary in order to have the upper surface of the two ribbons 14 and 15 at a proper welding temperature. The completed sheet 16 as it passes to the leer is maintained at a temperature such as to permit it to bend readily by reason of the application of heat from the leer chamber 37. This leer chamber is provided with suitable heating means which may be of any desired form, the openings 38 being indicated to permit of the insertion of burners to apply heat beneath the sheet as it is bent from a vertical position to a horizontal position. At this position of bending the glass has its surfaces chilled by reason of its contact with the rolls 10 and 12 and it is desirable at this point to bring the glass to a relatively high temperature, so that it may follow the desired curvature in shifting from a vertical position to a horizontal position and in order that the glass may assume a perfectly flat condition without subsequent warpage. At this time the glass is of such a temperature that it may sag slightly between the rollers upon which it is supported, but any curvature of this kind is eliminated as the glass passes forwardly toward the cool end of the leer, and, as the glass becomes flat, it sets, and, because of its uniform temperature, any tendency to warp is avoided.

The ribbon or sheet 16 is guided in its movement into the leer by means of the rolls 38ª, and later, after the sheet has been shifted to a horizontal position, it is carried throughout the length of the leer by means of other rollers 39. The rolls 38 and 39 are provided with sprockets at their outer ends, such sprockets lying outside of the leer, as indicated in Fig. 2 and being driven by the chain 40 which chain is adapted to be tightened by suitable take-up sprocket 41. The end roll 38 has its axle 42 extended, as indicated in Fig. 2 and provided with a sprocket 43 which is driven by means of the chain 44 passing around such sprocket and around a sprocket 45. The sprocket 45 is mounted upon a shaft 46 which carries a gear 47 driven by a spur gear 48 carried by the axle 49 of the worm drive. The chain 44 is also provided with a suitable take-up or tightening sprocket 50.

The wire mesh 17 is supplied from a roll 51 mounted in a frame member 52 supported at its ends upon the front walls of the chambers 2 and 3. In order to retard the movement of the roll and give the necessary tension upon the wire to hold it straight, the brake roll 53 is employed carried upon a pair of arms 54 pivoted to the frame member at 55. The wire mesh is guided in its movement to position between the rolls 10 and 12 by means of the rollers 56 carried by the ends of the pivoted roof members 28 and 29.

The foregoing arrangement is advantageous as the two ribbons 14 and 15 are supplied from bodies of molten glass having the same level, so that the pressure head is similar, and with the same speed of movement as supplied by the feed rolls 10 and 12, the ribbons 14 and 15 are similar as to thickness and temperature, and the wire mesh is applied midway between the surfaces of the finished ribbon 16.

The arrangement involving the flow of glass from the two opposing tank chambers is also advantageous as it provides a maximum amount of head room and clearance above the rolling apparatus when the roof members 28 and 29 are swung upward to open position. The use of the relatively small rolls 26 and 27, as compared with the size of the main rolls 10 and 12 also contribute to this effect, and the cooling effect of these rolls is less than with rolls of a larger diameter, so that the upper surfaces of the glass ribbons are not unduly reduced in temperature, which condition is desirable, so that the sheets will properly weld together with a minimum amount of re-heating after passing these rolls.

The entire roll mechanism, including the motor and transmission mechanism, is preferably mounted upon a truck 57 whose wheels 58 are supported upon the rails 59. These rails 59 extend out laterally beyond the sides of the tank chambers 2 and 3, so that the whole rolling apparatus may be readily moved from between the tank chambers when it becomes necessary to renew or repair any of the parts of the rolling mechanism or to substitute new clay blocks to take the place of those through which the passages 4 and 5 extend, this latter repair being necessary in the course of time, because of the gradual enlargement of the passages due to the action of the heat and flowing glass.

The construction of Figs. 4 and 5 is similar to that of Figs. 1, 2 and 3 except that the glass is drawn upwardly instead of being rolled downwardly. The tank receptacles 60 and 61 are provided with the outlets 62 and 63 leading between the pairs of rolls 64 and 65 and 66 and 67, such rolls serving to form the sheets 68 and 69 between which is placed the wire mesh 70 from the roll 71.

The roll 65 is driven from the motor 72 through the reducing mechanism in the casing 73 and the worm drive 74. The axle 75 of the worm wheel is provided with a pinion 76 (Fig. 5) meshing with a spur gear 77 on the axle of the roll 65. The gear 77 meshes with a gear 78 keyed to the axle of the roll 64 and this gear 78 in turn drives the gear 79 keyed to the axle of the roll 66. In order to feed the wire 70 upward between the glass sheets 68 and 69, the feed rolls 80 and 81 are employed, such rolls being provided with spur gears upon their axles, the gear on the axle of the roll 80 meshing with the gear 77 and the gear upon the roll 80 meshing with the gear upon the roll 81. The driving and roller mechanism is all mounted upon a truck 82 whose wheels 83 are supported upon the rails 84, so that the apparatus may be removed from between the tank chambers. After the two sheets 68 and 69 are rolled together to form the sheet 85, such sheet passes up between two pairs of endless belts 86 and 87. The lower ends of these belts pass around pulleys upon the axles 88 and 89, which also carry sprockets driven by the chains 90 and 91 passing around these sprockets and around suitable sprockets keyed to the axles of the rolls 80 and 81. The endless belts are preferably made of asbestos and are of such length that the temperature of the sheet passing therethrough is reduced to a temperature suitable for cutting before its emergence, the belts serving in this way not only as a carrier device, but also as an annealing device. However, the construction of the apparatus for taking care of the sheet after it leaves the rolls 64 and 66 is immaterial in so far as the present invention is concerned and the sheet may be passed through any suitable form of vertical leer or bent laterally and carried through a horizontal leer as in the construction of Figs. 1 and 2.

Fig. 6 involves a modification of the construction shown in Fig. 1 in that corrugated rolls are added to the construction of Fig. 1 in order to produce corrugated glass for use in tile or roofing. The drives for the rolls 92, 93, 94 and 95 are the same as heretofore described in connection with Figs. 1 and 2, while the corrugating rolls 96 and 97 located below the rolls 93 and 95 are driven by means of the pinion 98 which meshes with a spur gear carried by the axle of the roll 95 and with another spur gear 99 carried by the axle of the roll 97. The roll 96 also carries upon this axle a spur gear 100 meshing with the gear 99. The two glass ribbons 101 and 102 are formed into a single ribbon 103 with the wire mesh 104 therein, and such combined ribbon is then corrugated as indicated at 105. The corrugated ribbon of reinforced glass as thus produced is carried downwardly and laterally through a suitable leer of the character shown in Fig. 1, a suitable slideway 106 being provided to turn the glass laterally instead of the roller guide of Fig. 1, as such roller guide would not be suitable for engaging the corrugated sheet.

Fig. 7 involves a modification of the structure of Fig. 6 in that the rolls 107 and 108 beneath the rolls 93 and 95 are corrugated circumferentially instead of longitudinally. The sheet thus corrugated cannot easily be bent laterally so that it becomes desirable to sever the sheet into sections by means of a cutter 109, or some other suitable means, preliminary to carrying the sections through a leer. Any suitable form of severing means, transfer means and leer may be employed, but the preferred arrangement is that shown in the application of John H. Fox, filed of even date herewith.

What I claim is:

1. In combination in apparatus for making sheet glass, a pair of opposing tank receptacles each containing a bath of molten glass, and provided with opposing lateral outlets, a pair of rolls opposite each outlet in close proximity thereto to receive the glass therefrom with the passes therebetween under the head pressure in said receptacles and with the lower members of such pairs of rolls spaced so as to provide a vertical pass therebetween adapted to receive and press together the ribbons formed between the pairs of rolls, and means for rotating at least one roll of each of said pairs of rolls.

2. In combination in apparatus for making sheet glass, a pair of opposing tank receptacles each containing a bath of molten glass, and provided with opposing lateral outlets, a pair of rolls opposite each outlet in close proximity thereto to receive the glass therefrom with the passes therebetween under the head pressure in said receptacles and with the lower members of such pairs of rolls spaced so as to provide a vertical pass therebetween adapted to receive and press together the ribbons formed between the pairs of rolls, means for directing a wire mesh downwardly between the two ribbons as they are pressed together, and means for rotating said lower rolls.

3. In combination in apparatus for making sheet glass, a melting tank having an outlet end of U shape in horizontal cross section, a pair of horizontal outlet orifices extending through the inner walls of the U shaped outlet end in opposition to each other, means for flowing ribbons from such outlets to a position of engagement, and means for pressing the ribbons into welding engagement and causing the sheet thus formed to move vertically.

4. In combination in apparatus for making sheet glass, a melting tank having an outlet end of U shape in horizontal cross section, a pair of horizontal outlet orifices extending through the inner walls of the U shaped outlet end in opposition to each other, means for flowing ribbons from such outlets to a position of engagement, means for feeding a wire mesh between the ribbons, and means for pressing the ribbons into welding engagement and causing the sheet thus formed to move vertically.

In testimony whereof, I have hereunto subscribed my name this 9th day of Sept., 1922.

WILLIAM OWEN.